United States Patent

Noda

[11] Patent Number: 5,936,920
[45] Date of Patent: Aug. 10, 1999

[54] TRACKING METHOD AND DEVICE FOR USE WITH AN OPTICAL RECORDING MEDIUM

[75] Inventor: Kazuo Noda, Yokohama, Japan

[73] Assignee: Nippon Conlux Co., Ltd., Tokyo, Japan

[21] Appl. No.: 08/654,914

[22] Filed: May 29, 1996

[30] Foreign Application Priority Data

May 30, 1995 [JP] Japan ..................................... 7-155311

[51] Int. Cl.⁶ .................................................. G11B 7/095
[52] U.S. Cl. ..................................... 369/44.37; 369/44.41; 369/44.29
[58] Field of Search ............................. 369/44.37, 44.38, 369/44.41, 44.42, 44.26, 44.29, 44.35; 235/545

[56] References Cited

U.S. PATENT DOCUMENTS 5,153,863  10/1992  Noda et al. ........................... 369/44.37
5,363,358  11/1994  Yanagawa .

FOREIGN PATENT DOCUMENTS 0 324 949   7/1989   European Pat. Off. .
0 336 328  10/1989   European Pat. Off. .

*Primary Examiner*—Thang V. Tran
*Attorney, Agent, or Firm*—Graham & James LLP

[57] ABSTRACT

During recording of data on a recording medium, tracking is performed using auxiliary beams to refer to guide tracks as done in the conventional three-beam method. During reproduction of data from the recording medium, tracking is performed using a main beam to refer to a data pit recorded in a recording track in accordance with the push-pull method. In addition, there are provided two tracking control circuits based on the three-beam method and push-pull method, and the use of tracking control signals based on the three-beam and push-pull methods that are output from the two circuits is selected via a switch.

3 Claims, 3 Drawing Sheets

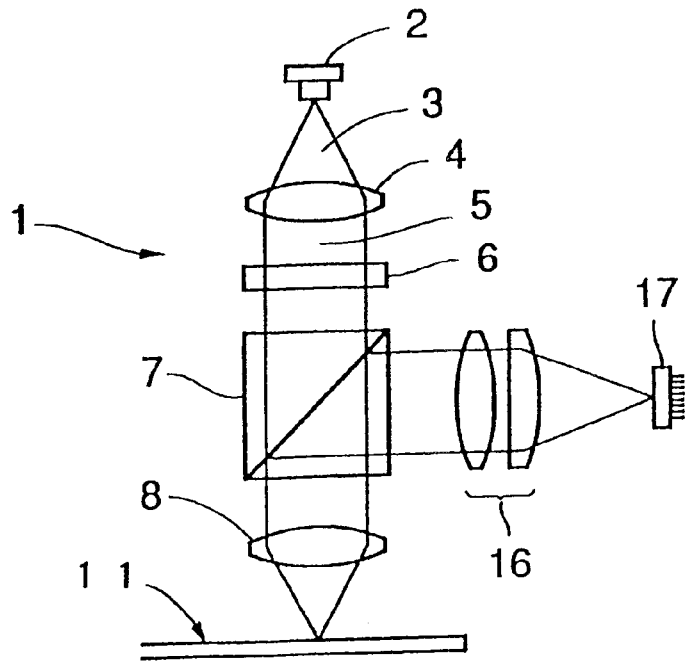
F I G. 1
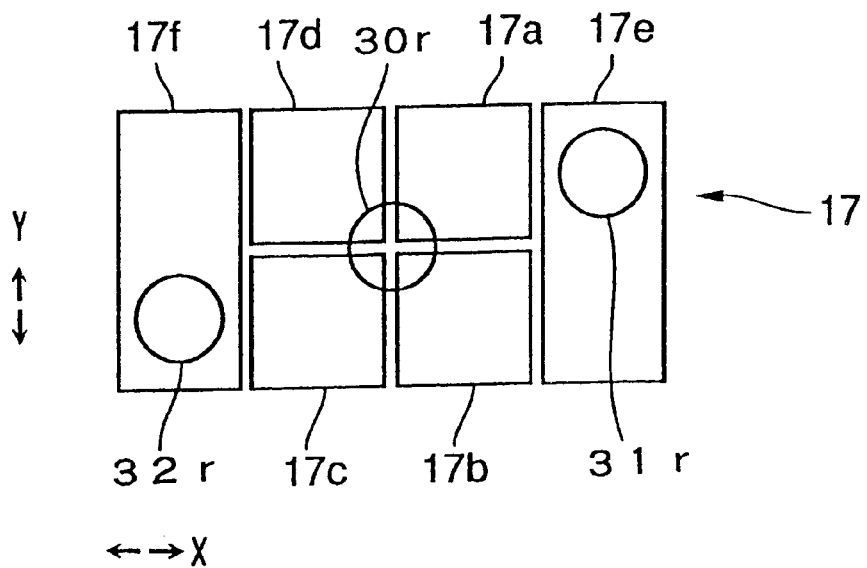
F I G. 2

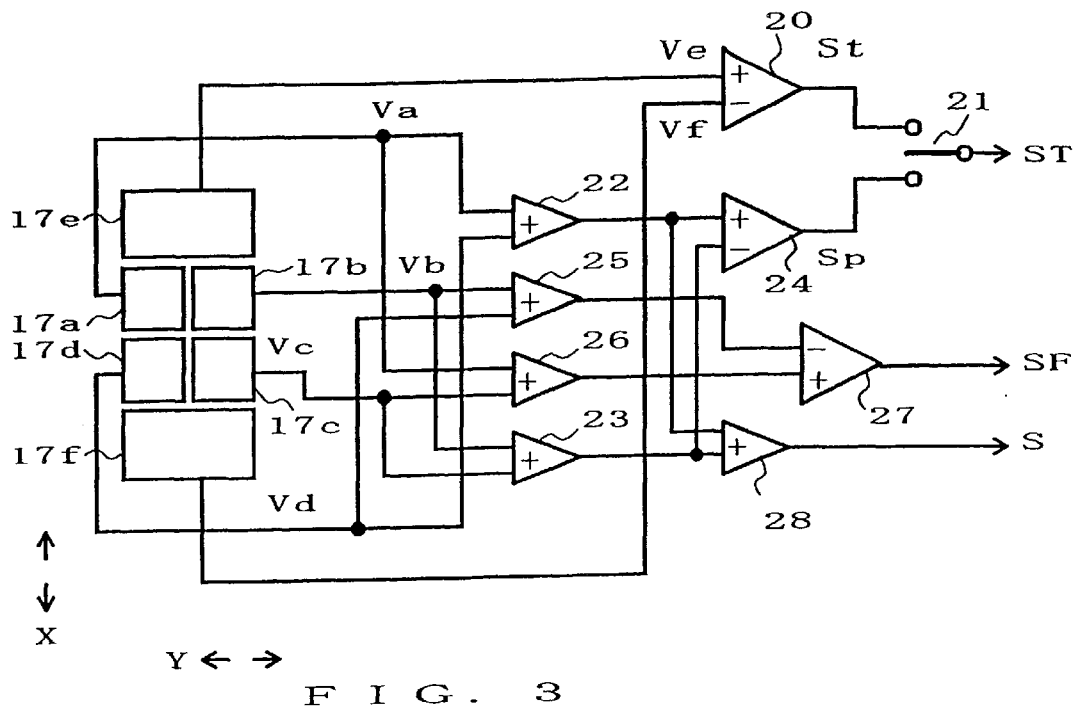
FIG. 3
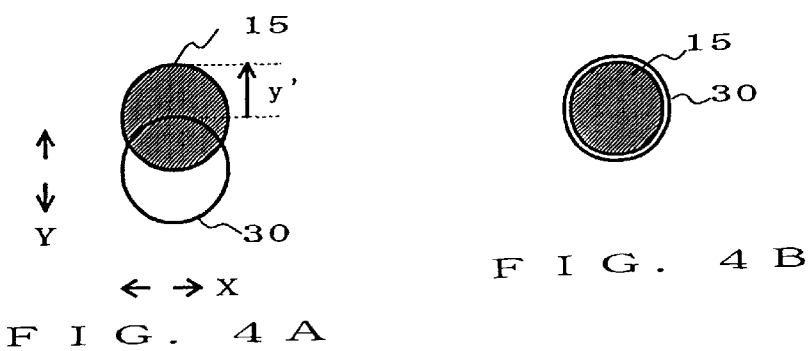
FIG. 4A
FIG. 4B
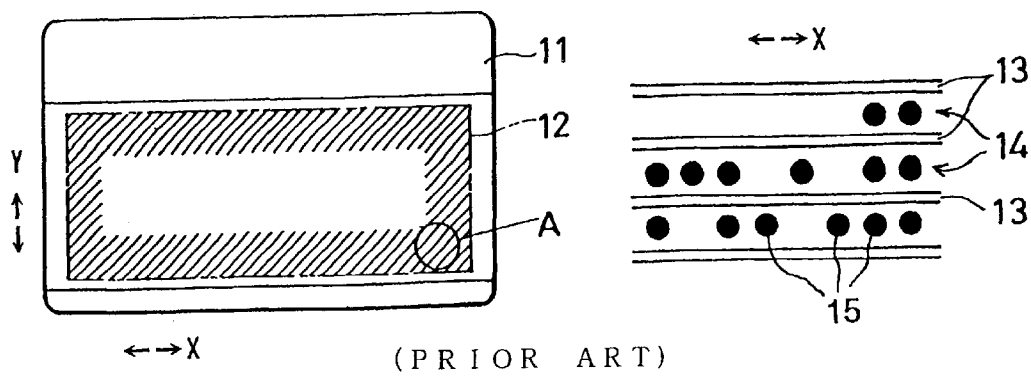
FIG. 5A (PRIOR ART)
FIG. 5B (PRIOR ART)
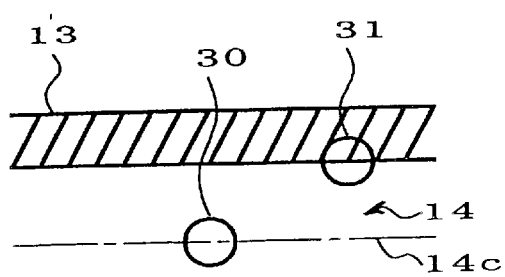
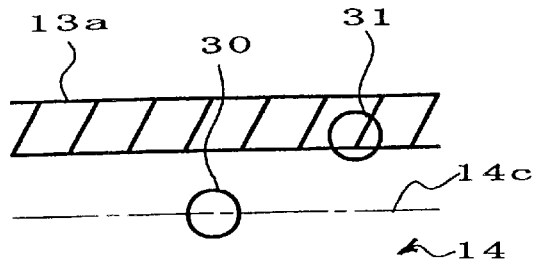
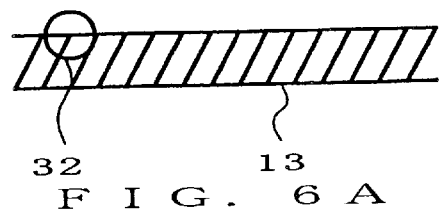
F I G. 6 A
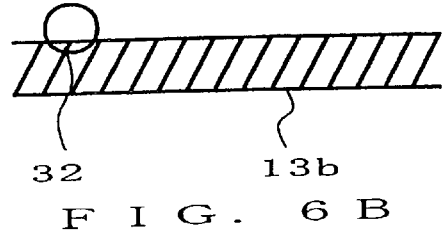
F I G. 6 B
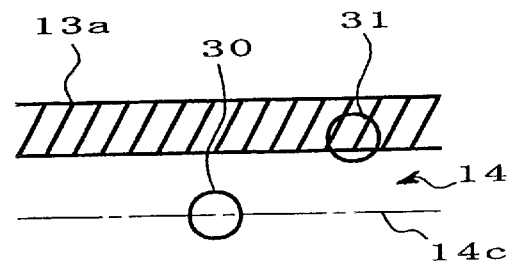
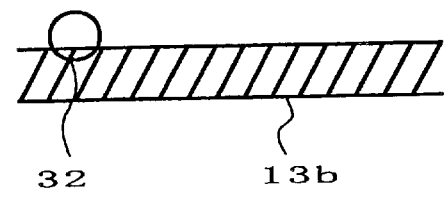
F I G. 6 C

TRACKING METHOD AND DEVICE FOR USE WITH AN OPTICAL RECORDING MEDIUM

BACKGROUND OF THE INVENTION

The present invention relates to a method and device for, when data are to be recorded and reproduced onto and from an optical recording medium such as an optical card, performing tracking a light beam emitted from a recording/reproducing optical head relative to a desired data recording track of the medium.

Optical information recording and reproducing apparatuses are known which record and reproduce information onto and from a card-like optical recording medium (hereinafter referred to as an optical card) by moving the optical card relative to an optical head substantially at right angle with the optical axis of a laser beam emitted from the head. With the developments and increasing use of computers etc., a wide use of the optical card has been strongly hoped for in recent years because it is highly portable and safe and yet provides a relatively large storage capacity for its small size, and a variety of applications of the optical card have been proposed.

A typical structure of the optical card is shown in FIGS. 5A and 5B, of which FIG. 5A is a plan view of the known optical card 11 and FIG. 5B shows in enlarged scale a part (section "A") of the optical card 11 of FIG. 5A. In FIG. 5B, reference numeral 12 denotes a recording/reproducing area, 13 denotes guide tracks, and 14 denotes data recording tracks each provided between the guide tracks 13. On the recording/reproducing area 12 of the optical card 11, there are provided a multiplicity of guide tracks 13 and data recording tracks 14 in parallel relation to one another. The recording/reproducing area 12 includes a recording layer that is for example made of silver chloride photographic material as its base material. By irradiating a laser light spot of a suitable energy level from an optical head onto the recording layer, optical information units called "pits" 15 are formed or recorded in the data recording track 14. The position of the irradiated laser light spot on the recording layer is variable by moving the optical card 11 relative to the optical head in the X-axis direction (direction parallel to the length of the data and guide tracks 13 and 14 of the optical card 11), so that a series of pits can be formed in a desired arrangement corresponding to desired digital information. Thus, recording and reproduction of desired digital information are performed by writing and reading a row of the pits to and from the recording layer of the optical card 11. The guide tracks 13, and non-recorded portions of the data recording tracks 14 (i.e., portions having no data pit 15 formed therein) have different light reflecting characteristics; for example, the guide tracks 13 have a lower reflectivity than the unrecorded data recording track portions.

In order to form pit rows in the data recording track 14 of the optical card 11, such an approach is generally employed which uses a drive mechanism such as a linear motor to move the optical card 11 relative to the optical head. However, due to a limited operational accuracy of the drive mechanism, this prior approach can not reliably avoid occurrence of mechanical position errors, due to which pits can not be formed accurately in the central part of the data recording track 14 located between the guide tracks 13. This presents the significant problem that desired information can not be recorded accurately. In order to avoid this problem, it is absolutely necessary to perform the pit recording with the laser beam spot positioned in the central part of the recording track 14 precisely between two adjacent guide tracks 13. Reproduction of the recorded pits must also be performed with the laser beam spot accurately positioned in the central part of the recording track 14. To this end, automatic tracking control (often abbreviated "AT control") has been so far employed in an attempt to always position the laser beam spot at an optimum position while constantly compensating for any mechanical position errors caused.

The automatic tracking control has been performed so far in accordance with the so-called "three-beam method" for both recording and reproduction. According to the three-beam method, three laser beams spaced apart from each other by predetermined distances are irradiated from the optical head in such a manner that the central (main) laser beam corresponds to the data recording track 14 as a recording/reproducing beam and the two other (auxiliary) laser beams on both sides of the central beam correspond to the guide tracks 13 on both sides of the data recording track 14 as tracking beams. Namely, the three-beam method measures the respective reflected lights of the two auxiliary laser beams from the optical card 11 so as to servo-control the irradiated beam spot positions in such a manner that the tracking beams accurately correspond to the guide tracks 13 in predetermined positional relations thereto and thus the central main beam is allowed to be always accurately positioned in a predetermined central part of the data recording track 14. Further, it is necessary to have the laser light beams constantly stably focused on the recording layer of the optical card 11, and automatic focusing control has also conventionally been performed for this purpose.

The above-mentioned automatic tracking and focusing control operations are performed by minutely driving the objective lens of the optical head, via electromagnetic force applied via a tracking coil and a focusing coil, respectively, in the Y-axis direction (i.e., direction transverse to the data recording and guide tracks of the optical card 11) and in the Z-axis direction (i.e., direction perpendicular to the recording/reproducing surface of the optical card 11). The objective lens operates to focus the laser beam emitted from the optical head onto the recording layer of the optical card 11 so as to form a focused light spot (three light spots in the case where the above-mentioned three-beam method is employed) on the recording layer.

The automatic tracking control according to the three-beam method will be described below in greater detail. According to the three-beam method, the main beam 30 and auxiliary beams 31, 32 are emitted from the optical head so that the beams are irradiated onto the optical card 11 in predetermined positional relations to each other, as shown in FIG. 6A. In such a manner that about half portions of the auxiliary beams 31 and 32 are accurately irradiated onto the two guide tracks 13 on both sides of the data recording track 14, the respective positions of the irradiated beams from the optical head are controlled minutely by means of the above-mentioned tracking coil while the optical card 11 are moved relative to the optical head in the direction parallel to the length of the recording track 14 (i.e., X-axis direction). In this case, signals indicative of reflected light quantities (reflected light signals) of the auxiliary beams 31 and 32 are differentially amplified, and then servo control is performed so that the differentially amplified output becomes null. In recording data, data pits are formed in the data recording track 14 by increasing the light intensity of the main beam 30 for each predetermined data recording point while performing the tracking control in the above-mentioned manner.

Similarly, for reproduction of the recorded data according to the three-beam method, the main laser beam 30 is irradiated onto the data recording track 14 while performing the tracking control by radiating the three beams in such a manner that about half portions of the auxiliary beams 31 and 32 are accurately irradiated onto the two guide tracks 13. Specifically, the recorded data are reproduced by transforming detected variations in intensity of reflected light from the data recording track 14 into electric current variations. The main beam 30 used for reproducing data is set to a lower intensity than that used for recording data; typically, the reproducing beam intensity is about one tenth of the recording beam intensity.

Although the three-beam method is a highly stable method that is often used in cases where the tracking control is performed by irradiating the auxiliary beams on both sides of a designated data recording track as in reproduction of a CD (Compact Disk), this method presents the inconvenience that some data are undesirably recorded off the center of the recording track if the guide tracks on both sides of the recording track have non-uniform widths and light reflectivities and/or if the light intensity of the two auxiliary beams do not balance.

That is, if the guide tracks 13 on both sides of the recording track 14 have uniform widths and light reflectivities and the light intensity of the two auxiliary beams is equal, the two auxiliary beams 31 and 32 are positioned at locations such that respective halves of the auxiliary beams 31 and 32 can be accurately irradiated onto the two guide tracks 13, i.e., exactly halves of the two auxiliary beams 31 and 32 can be irradiated onto the respective guide tracks 13, as shown in FIG. 6A. Thus, the main beam 30 can be irradiated accurately onto the central part of the data recording track 14, so that center line 14c of a row of recorded data pits in the track 14 lies exactly in the middle between the two guide tracks 13 without any positional deviation.

However, when the reflectivity of one of the guide tracks 13 (e.g., guide track 13a) has become higher than the other guide track 13 (e.g., guide track 13b), the automatic tracking is performed in such a manner that more than half of the auxiliary beam spot 31 is irradiated onto the higher-reflectivity guide track 13a and less than half of the auxiliary beam spot 32 is irradiated onto the lower-reflectivity guide track 13b as shown in FIG. 6B so that the respective reflection intensity of the two auxiliary beams 31 and 32 becomes equal. Consequently, the main beam spot 30 is placed off the center of the data recording track 14 toward one guide track 13a, and the center line 14c of a row of recorded data pits in the track 14 deviates from the center of the recording track 14, as shown in FIG. 6B.

Conversely, when the reflectivity of the guide track 13a has become lower than the other guide track 13b, the tracking is performed in such a manner that the irradiated spot of the main beam 30 is positioned off the center of the recording track 14 toward the guide track 13b so that the center line 14c of a row of recorded data pits in the track 14 deviates from the center of the recording track 14 toward the guide track 13b.

Further, when the light intensity of one of the auxiliary beams (e.g., auxiliary beam 31) has become higher than the other auxiliary beam (e.g., auxiliary beam 32), the automatic tracking is performed in such a manner that more than half of the auxiliary beam spot 31 is irradiated onto the guide track 13a and less than half of the auxiliary beam spot 32 is irradiated onto the guide track 13b as shown in FIG. 6C so that the respective reflection intensity of the two auxiliary beams 31 and 32 balances. Consequently, the main beam spot 30 is placed off the center of the data recording track 14 toward one guide track 13a, and the center line 14c of a row of recorded data pits in the track 14 deviates from the center of the recording track 14 toward the guide track 13a, as shown in FIG. 6C.

Conversely, when the reflectivity of the auxiliary beam 31 has become lower than the other beam 32, the tracking is performed in such a manner that the irradiated spot of the main beam 30 is positioned off the center of the recording track 14 toward the guide track 13b, with the result that the center line 14c of a row of recorded data pits in the track 14 deviates from the center of the recording track 14 toward the guide track 13b.

The positional deviation of the center line 14c of a recorded data pit row does not present significant inconveniences as long as data reproduction is performed exactly in the same conditions as in data recording. However, because conditions in data reproduction usually differ from those in data recording, there would occur the problem that levels of reproduced data signals are undesirably lowered.

Assume a case where the light intensities of the two auxiliary beams used in data recording were unbalanced, and thus data pits were recorded off the center of the data recording track 14 toward one of the guide tracks 13a, causing positional deviation of the center line 14c of the recorded data pit row as shown in FIG. 7. If, in this case, the light intensity of the two auxiliary beams to be used in data reproduction do balance or are unbalanced in an opposite manner to the unbalanced condition in the recording, the automatic tracking is performed in such a manner to position the reproducing main beam 30 off the center line 14c of the recorded data pit row as shown in FIG. 7. Due to such a positional deviation between the data pits 15 and the main beam 30, variations in the reflected light intensity would be reduced to present reduced levels of reproduced data signals, so that the C/N (Carrier-to-Noise) ratio is reduced. This results in increased errors in the reproduced data. Further, even when the center line 14c of the recorded data pit row is coincident with the center of the recording track 14, similar problems occur in the event that the two auxiliary beams to be used in data reproduction have unequal light intensity.

SUMMARY OF THE INVENTION

It is therefore an object of the present invention to provide a tracking method and device which allow a data reproducing main beam to be always accurately irradiated onto the center of a row of data pits recorded in a data recording track and prevents reduction in levels of reproduced data signals even when there is a positional deviation in the recorded data pit row or two data reproducing auxiliary beams have unequal light intensity.

In order to accomplish the above-mentioned object, the present invention provides a tracking method for use with an optical recording medium having guide tracks adjacent to a data recording track, the method comprising a step of, during recording of data on the recording medium, performing tracking by employing an optical head emitting a data recording main beam and a tracking auxiliary beam and using the auxiliary beam to refer to the guide track, and a step of, during reproduction of data from the recording medium, performing tracking by employing an optical head emitting at least a data recording main beam and using the main beam to refer to a position of a data pit recorded in the recording track in accordance with a push-pull method.

The present invention also provides a tracking device for use with an optical recording medium having guide tracks adjacent to a data recording track, the device comprising a first tracking section for, during recording of data on the recording medium, performing tracking by employing an optical head emitting a data recording main beam and a tracking auxiliary beam and using the auxiliary beam to refer to the guide track, and a second tracking section for, during reproduction of data from the recording medium, performing tracking by employing an optical head emitting at least a data recording main beam and using the main beam to refer to a position of a data pit recorded in the recording track in accordance with a push-pull method.

According to the present invention thus arranged, during recording of data on the recording medium, tracking is performed by employing the optical head emitting a data recording main beam and a tracking auxiliary beam and using the emitted auxiliary beam to refer to the guide track. Namely, during recording of data, the tracking is performed for example in accordance with the three-beam method. During reproduction of data from the recording medium, tracking is performed by employing the optical head emitting at least a data recording main beam and using the emitted main beam to refer to a position of a data pit recorded in the recording track in accordance with the push-pull method. Thus, automatic tracking control is performed properly in such a manner that, even when the center of a row of recorded data pits in the data recording track is deviated toward one of the two guide tracks located on both sides of the recording track, the push-pull tracking using the main beam permits the main beam to be accurately irradiated onto each recorded pit in a substantially concentric relation therewith. Consequently, the present invention can advantageously prevent undesirable reduction in signal level and C/N ratio of reproduced data.

When the main beam irradiated onto the data recording track is off the center of a data pit, reflected light of the main beam presents asymmetric distribution of light intensity in the direction perpendicular to the data recording track (i.e., the Y-axis direction). The push-pull method using the main beam is a tracking method for addressing this problem, which detects a difference in the asymmetric intensity distribution and controls the irradiated position of the main beam in such a manner to eliminate the difference, i.e., controls the reflected light intensity distribution in the Y-axis direction, detected by the main-beam-reflection receiving element, so as to balance symmetrically. For example, a light receiving element divided into at least two element members separated from each other at right angle to the tracks may be provided for cooperatively receiving the reflected light of the main beam, in which case the push-pull method may control the irradiated position of the main beam in such a manner that output signals from the two divided element members are balanced. In the case of an unrecorded (blank) optical card, the push-pull method using the main beam can not be performed because the card has only guide tracks and no data pit row is yet recorded in the data recording track, and therefore, such tracking must be performed which uses the auxiliary beams to refer to the guide tracks.

BRIEF DESCRIPTION OF THE DRAWINGS

For better understanding of the above and other features, the preferred embodiments of the present invention will be described in detail hereinbelow with reference to the accompanying drawings, in which:

FIG. 1 is a schematic side view showing an example structure of a recording/reproducing optical head for use in an embodiment of the present invention;

FIG. 2 is a plan view showing an example arrangement of light receiving elements in the optical head of FIG. 1;

FIG. 3 is a block diagram illustrating an example of a tracking control circuit provided in connection with the light receiving elements in the optical head of FIGS. 1 and 2;

FIGS. 4A and 4B are diagrams explanatory of push-pull tracking control performed during data reproduction in the embodiment of FIG. 3;

FIG. 5A is a plan view showing an example of a data recording/reproducing area on a conventionally-known optical card;

FIG. 5B is a plan view showing in enlarged scale a part of the data recording/reproducing area of FIG. 5A;

FIGS. 6A to 6C are diagrams showing various conditions in which main and auxiliary beams are irradiated onto data and guide tracks of the optical card in accordance with the known three-beam method.

DETAILED DESCRIPTION OF THE PREFERRED EMBODIMENTS

Figure 7:
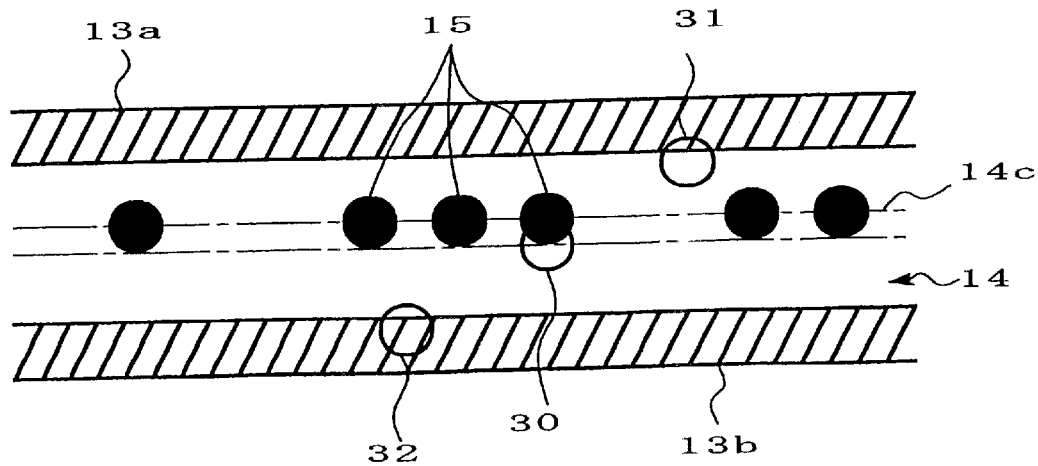
FIG. 7 is a diagram illustrating, as problems of the prior art to be solved, positional deviation of data pits recorded in the data recording track and of irradiated positions of the reproducing laser beam.

FIG. 1 shows an example structure of an optical head 1 which is suitably usable to practice the present invention. In FIG. 1, a divergent laser light beam 3 emitted from a semiconductor laser 2 is converted through a collimating lens 4 into a collimated light beam 5 and then divided through a diffraction grating structure 6 into a plurality of light beams. The plural light beams pass through a beam splitter 7 and converged through an objective lens 8 to be irradiated onto an optical recording medium such as an optical card 11. The optical recording medium or optical card 11 includes a multiplicity of guide tracks 13 and data recording tracks 14 provided thereon in parallel relation to one another, in a similar manner to the conventional optical card shown in FIG. 5. These tracks 13 and 14 in the embodiment need not necessarily be linear tracks arranged in parallel, but may be arcuate or circular tracks arranged in parallel on a disk-shaped recording medium.

According to a preferred embodiment of the present invention, the light beams emitted from the optical head 1 may be three beams which comprise a focused main beam 30 and two auxiliary beams 31 and 32 positioned on both sides of the main beam 30 and skewed at a predetermined angle relative to the main beam 30, as in the conventionally known example of FIGS. 6 and 7.

During recording of data, the semiconductor 2 emits the light beams with great laser power, and desired data are recorded by the main beam 30 while performing automatic tracking in accordance with the three-beam method using the two auxiliary beams 31 and 32 irradiated onto the guide tracks 13. The data recording is executed by varying voltage applied from the semiconductor laser 2. For example, when recording data at a desired pit position, the laser power of the main beam 30 may be 10 mW and the laser power of the two auxiliary beams 31 and 32 may be 1 mW.

On the other hand, during reproduction of data, the laser power emitted from the semiconductor laser 2 is reduced by a factor of about 10 from that used for the data recording, and desired data are reproduced while performing automatic tracking control in accordance with the push-pull method using the main beam 30 kept at a constant laser power level.

Although not specifically described here, focusing control is performed, during both the data recording and the data reproduction, in accordance with the conventional astigmatism or the like using the main beam 30.

During the data recording and reproduction, the laser beams reflected from the optical card 11 backtrack through the objective lens 8 to the beam splitter 7, where the beams are reflected toward a light receiving lens 16. The beams are converged by the light receiving lens 16 and then input to a light receiving unit 17.

As shown in FIG. 2, for example, the light receiving unit 17 comprises four central light receiving element members 17a, 17b, 17c and 17d provided to cooperatively receive the reflected light 30r of the single main beam 30, and side light receiving elements 17e and 17f to receive the reflected light 31r and 32r of the auxiliary beams 31 and 32, respectively. As shown, the four central light receiving element members 17a, 17b, 17c and 17d are generally in a square arrangement, and the side light receiving elements 17e and 17f are disposed on both sides of the square arrangement of the element members 17a, 17b, 17c and 17d. The reflected light 30r of the main beam 30 from the optical card 11 is set to be input to the center of the squarely-arranged central light receiving element members 17a, 17b, 17c and 17d, and the reflected light 31r and 32r of the auxiliary beams 31 and 32 from the optical card 11 are set to be input to the side light receiving elements 17e and 17f, respectively. In FIG. 2, arrows X and Y denote directions where the optical head 1 and optical head 11 are moved relative to each other; the arrow X direction corresponds to the longitudinal direction of the tracks and the arrow Y direction corresponds to the direction where the light beams are minutely moved relative to the optical card 11 at right angle to the tracks for desired automatic tracking control.

FIG. 3 shows an example of a circuit for taking out tracking control signals from the light receiving unit 17 for both data recording and data reproduction.

Output signals Ve and Vf from the element members 17e and 17f receiving the reflected light 31r and 32r of the two auxiliary beams 31 and 32 are delivered to a differential circuit 20, which in turn outputs a difference between the output signals Ve and Vf (Ve−Vf) as a tracking control signal St based on the three-beam method. During data recording, a switch 21 is connected to select, as a tracking control signal ST, the output signal St from the differential circuit 20. The tracking control signal ST thus selected by the switch 21 is supplied to a tracking actuator (not shown) so that tracking servo control for data recording is performed in such a manner that the tracking control signal ST (i.e., St) becomes null. Thus, during data recording, automatic tracking according to the three-beam method is executed in the conventional manner by using the auxiliary beams 31 and 32 to refer to the guide tracks 13 provided on both sides of the data recording track 14 in question.

In the illustrated example of FIG. 3, to execute tracking according to the push-pull method, the four central light receiving element members 17a to 17d for the main beam can be divided, with respect to the direction perpendicular to the tracks (i.e., Y direction), into two groups: group of element members 17a and 17d; and group of element members 17b and 17c. Output signals Va and Vd from the left-group light receiving element members 17a and 17d are input to an adder 22 while output signals Vb and Vc from the right-group light receiving element members 17b and 17c are input to an adder 23, and each of the adder circuits 22 and 23 calculates a sum of the output signals from the corresponding group 17a and 17d or 17b and 17c. Respective sums calculated by the adders 22 and 23 are delivered to a differential circuit 24, which in turn outputs a difference between the respective sums "(Va+Vd)−(Vb+Vc)" as a tracking control signal Sp based on the push-pull method. During data reproduction, the switch 21 is connected to select, as the tracking control signal ST, the output signal Sp from the differential circuit 24. The tracking control signal ST thus selected by the switch 21 is supplied to the abovementioned tracking actuator so that tracking servo control for data reproduction is performed in such a manner that the tracking control signal ST (i.e., Sp) becomes null.

Thus, during data reproduction, automatic tracking according to the push-pull method is executed by using the main beam 30 to refer to the data pits 15 in the recording track 14 in question. That is, the tracking servo control is continually performed in such a manner that the total received light amount (Va+Vd) of the left-group light receiving element members 17a and 17d and the total received light amount (Vb+Vc) of the right-group light receiving element members 17b and 17c are balanced. Specifically, because the embodiment is designed to allow the left half of the reflected light spot 30r of the main beam 30 to precisely hit the left-group light receiving element members 17a and 17d and allow the right half of the reflected light spot 30r of the main beam 30 to precisely hit the right-group light receiving element members 17b and 17c, the adder circuit 22 outputs a signal representing the total light intensity of the left half of the reflected light spot 30r of the main beam 30 while the adder circuit 23 outputs a signal representing the total light intensity of the right half of the reflected light spot 30r. Thus, the tracking servo control is executed in such a manner that the light intensity signals output from the adder circuits 22 and 23 are balanced, i.e., the center of the main beam 30 virtually coincides with the center of the data pit 15.

The push-pull operation will be further explained below with reference to FIG. 4. When the center of the irradiated main beam spot 30 is off the center of the data pit 15 in the recording track 14 as shown in FIG. 4A, there occurs unbalance in light intensity between the left and right halves of the reflected light spot 30r incident on the light receiving element members 17a to 17d of FIG. 2. Specifically, assuming that the upper and lower halves of the main beam 30 in FIG. 4A correspond to the left and right halves of the reflected light spot 30r, respectively, incident on the light receiving element members 17a to 17d, the light intensity of the left half of the spot 30r is greater than that of the right half. Then, the differential circuit 24 outputs, as the tracking control signal ST, signal Sp having a value corresponding to the light intensity unbalance, so that the tracking actuator is servo-driven in such a manner to rectify this unbalance. Thus, the irradiated position of the main beam 30 on the data recording track 14 is minutely moved via the servo control, by vector y' in FIG. 4A, so as to be substantially concentric with the data pit 15 as shown in FIG. 4B.

Referring back to FIG. 3, the output signals Vb and Vd from the light receiving element members 17b and 17d are delivered to an adder circuit 25, and the output signals Va and Vc from the light receiving element members 17a and 17c are delivered to an adder circuit 26. Then, output signals from the two adder circuits 25 and 26 are given to a differential circuit 27, which in turn outputs a difference between the given signals "(Va+Vc)−(Vb+Vd)" as a focusing control signal SF based on the astigmatism method. In this way, the light receiving element members 17a to 17d for receiving the reflected light spot 30r of the main beam 30 are used for both the push-pull tracking control and the astigmatism focusing control, and this is the reason why the four separate light receiving element members 17a to 17d are provided and their output signals are added in various combinations in the present embodiment. Therefore, where only the push-pull tracking control is to be performed, only two separate light receiving element members will suffice. Namely, each group of the light receiving element members 17a and 17d and 17b and 17c may be integrated, and the adder circuits 22 and 23 may of course be omitted. In such a case, the focusing control may be executed by any other appropriate means. However, the four separate light receiving element members 17a to 17d for receiving the main beam reflection in the present embodiment are very useful because they can be used for both the push-pull tracking control and the astigmatism focusing control.

Further, in FIG. 3, the output signals from the adders 22 and 23 are delivered to another adder circuit 28, which in turn outputs a signal representing a total sum of the output signal from all the main beam receiving element members 17a to 17d "Va+Vb+Vc+Vd". The output signal from the adder circuit 28 is then supplied to another circuit (not shown) as a reproduced data signal S having a level corresponding to presence or absence of the data pit 15 in the data recording track 14.

With the above-mentioned arrangements, the automatic tracking control is performed in such a manner that the center of the main beam 30 constantly coincides with the center line 14c of a row of recorded data pits 15 in the data recording track 14. This prevents undesirable reduction in signal level and C/N ratio of reproduced data which resulted from the main beam deviating from the data pits in the conventional technique.

In the above-described embodiment of the present invention, the same optical head 1 is used in common for recording and reproduction of data, and the same tracking control circuit of FIG. 3 is also used for both the data recording and reproduction via a selection or switching of the switch 21. Alternatively, different optical heads may be used for the data recording and reproduction operation. Irrespective of the type of the optical head used, it is possible to implement the method and device of the present invention with such a system arrangement that during data recording, the data recording main beam 30 and tracking auxiliary beams 31 and 32 are emitted by the optical head with the tracking being performed using the auxiliary beams 31 and 32 to refer to the guide tracks 13, while during data reproduction, at least the recording main beam 30 is emitted by the optical head with the tracking being performed using the main beam 30 to refer to the position of each recorded data pit 15 in accordance with the push-pull method. Similarly, as the tracking control circuit, a circuit for performing the three-beam tracking servo control may be employed during the data recording, and another circuit for performing the push-pull tracking servo control may be employed during the data reproduction. However, the above-described arrangement of FIG. 3, where the same tracking control circuit is used and the three-beam tracking servo control for data recording and the push-pull tracking servo for data reproduction are selectively used via a selection of the switch 21, is very advantageous because the single circuit can be used very efficiently. It should be obvious that the tracking servo control for data recording may be based on any other method than the three-beam method as long as the auxiliary beams are used to refer to the guide tracks.

Further, whereas the preferred embodiment of the present invention has been described above in relation to a case where the optical card 11 is used as an optical recording medium, the present invention is also applicable to any other form of recording medium than the optical card, as long as the recording medium has guide tracks provided thereon.

As has been described so far with reference to the accompanying drawings, the present invention is characterized in that during data recording, the data recording main beam and tracking auxiliary beams are emitted by the optical head with the automatic tracking being performed using the emitted auxiliary beams to refer to the guide tracks, and that during data reproduction, at least the recording main beam is emitted by the optical head with the tracking control being performed using the emitted main beam to refer to the position of each recorded data pit in accordance with the push-pull method. With such characteristic arrangements, the automatic tracking control can be performed properly in such a manner that, even when the center of a row of recorded data pits in a data recording track is deviated toward one of the two guide tracks located on both sides of the recording track, the push-pull tracking control using the main beam permits the main beam to be accurately irradiated onto each recorded pit in a substantially concentric relation therewith. Thus, the present invention can advantageously prevent undesirable reduction in signal level and C/N ratio of reproduced data and effectively minimize errors of reproduced data.

What is claimed is:

1. A tracking device for use with an optical recording medium having guide tracks adjacent to a data recording track, said device comprising:

an optical head providing a main beam for recording and reproducing data to and from said data recording track and two auxiliary beams for referring to the respective guide tracks adjacent said data recording track;

a main beam receiving section receiving reflected light of said main beam;

an auxiliary beam receiving section receiving reflected light of said auxiliary beams;

a first tracking circuit providing, during recording of data on the recording medium, a first tracking control signal for maintaining tracking with said guide tracks using an output of said auxiliary beam receiving section;

a second tracking circuit providing, during reproduction of data from the recording medium, a second tracking control signal for maintaining tracking with a position of a data pit recorded in the recording track in accordance with a push-pull method using an output of said main beam section;

a selecting circuit selecting one of said first and second tracking control signals provided by said first and second tracking circuits depending on whether data is to be recorded or reproduced from the recording medium; and a tracking control device for servo-control tracking of the main and auxiliary beams by employing said selected one of said first and second tracking control signals.

2. A tracking device as defined in claim 1 wherein:

said auxiliary beam receiving section includes separate light receiving elements for receiving reflected light of respective ones of the two auxiliary beams, and said first tracking signal further comprises a difference between output signals of said light receiving elements corresponding to the two auxiliary beams; and said main beam receiving section includes a light receiving element for receiving said reflected light of the main beam, said light receiving element further including at least two element members separated from each other at a right angle to the tracks, and said second tracking control signal further comprises a difference between output signals from said two element members corresponding to the main beam.

3. A tracking device as defined in claim 2 wherein said main beam receiving section further comprises four divided element members, and wherein said second tracking circuit includes a circuit for adding together output signals from two groups each consisting of a predetermined combination of two said element members and outputting, as said second tracking control signal, a difference between the added output signals from said two groups.

* * * * *